United States Patent
Sinha et al.

(10) Patent No.: US 6,223,324 B1
(45) Date of Patent: Apr. 24, 2001

(54) MULTIPLE PROGRAM UNEQUAL ERROR PROTECTION FOR DIGITAL AUDIO BROADCASTING AND OTHER APPLICATIONS

(75) Inventors: Deepen Sinha; Carl-Erik Wilhelm Sundberg, both of Chatham, NJ (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/225,794

(22) Filed: Jan. 5, 1999

(51) Int. Cl.$^7$ .................................................. H03M 13/35
(52) U.S. Cl. ........................................ 714/776; 714/774
(58) Field of Search ............................................. 714/776

(56) References Cited

U.S. PATENT DOCUMENTS 5,463,641   10/1995   Dorward et al. ..................... 371/37.4

OTHER PUBLICATIONS

D. Sinha, J.D. Johnston, S. Dorward and S.R. Quackenbush, "The Perceptual Audio Coder," in Digital Audio, Section 42, pp. 42–1 to 42–18, CRC Press, 1998.

N.S. Jayant and E.Y. Chen, "Audio Compression: Technology and Applications," AT&T Technical Journal, pp. 23–24, vol. 74, No. 2, Mar.–Apr. 1995.

J. Hagenauer, "Rate Compatible Punctured Convolutional Codes (RCPC Codes) and their Applications," IEEE Transactions on Communications, vol. 36, No. 4, pp. 389–400, Apr. 1988.

J. Hagenauer et al., "The Performance of Rate–Compatible Punctured Convolutional Codes for Digital Mobile Radio," IEEE Transactions on Communications, vol. 38, No. 7, pp. 966–980, Jul. 1990.

R.V. Cox et al., "Sub–band Speech Coding and Matched Convolutional Channel Coding for Mobile Radio Channels," IEEE Transactions on Acoustics, Speech and Signal Processing, vol. 39, No. 8, pp. 1717–1731, Aug. 1991.

A.R. Calderbank and N. Seshadri, "Multilevel Codes for Unequal Error Protection," IEEE Transactions on Information Theory, vol. 39, No. 4, pp. 1234–1248, Jul. 1993.

C.–E.W. Sundberg, "Digital Audio Broadcasting in the FM Band," Proceedings of the IEEE Symposium on Industrial Electronics, Portugal, Jul. 7–11, 1997.

C.–E.W. Sundberg, "Digital Audio Broadcasting: An Overview of Some Recent Activities in the U.S.," Proceedings of Norsig–97, Norwegian Signal Processing Symposium, Tromso, Norway, May 23–24, 1997.

Hallier et al., "Multimedia Broadcasting to Mobile, Portable, and Fixed Receivers using the Eureka 147 Digital Audio Broadcasting System", 5th IEE Intl. Symposium on Personal, Indoor and Mobile Communications, 1994, pp. 794–798, Dec. 1994.*

* cited by examiner

*Primary Examiner*—Stephen M. Baker
(74) *Attorney, Agent, or Firm*—Ryan, Mason & Lewis LLP

(57) ABSTRACT

The invention provides methods and apparatus for processing information, e.g., audio, video or image information, for transmission in a communication system. In an illustrative embodiment, the value of a single-bit or multiple-bit criticality flag is determined for each of the programs in a set of multiple programs to be transmitted in the system. The information bits for each of the programs are then separated into n classes, where n is greater than or equal to two, based on the values of the criticality flags for the programs. Each of the classes is provided with a different level of error protection, e.g., through the use of different convolutional codes or other suitable techniques. The program or programs having the highest criticality flag values in a given frame or other designated time interval thus have a larger percentage of their information bits assigned to the class that is provided with the highest level of error protection. The assignment of the multiple program bits to the classes, as well as the characteristics of the classes, may be fixed for a designated number of program frames, or dynamic, i.e., permitted to vary from frame to frame.

20 Claims, 1 Drawing Sheet

MULTIPLE PROGRAM UNEQUAL ERROR PROTECTION FOR DIGITAL AUDIO BROADCASTING AND OTHER APPLICATIONS

FIELD OF THE INVENTION

The present invention relates generally to digital audio broadcasting (DAB) and other techniques for transmitting information, and more particularly to techniques for providing unequal error protection (UEP) for different classes of audio, video, image or other information bits encoded in a source coding device.

BACKGROUND OF THE INVENTION

Most source coded bit streams exhibit unequal sensitivity to bit errors. For example, certain source bits can be much more sensitive to transmission errors than others. Moreover, errors in certain bits, such as control bits, may lead to severe error propagation and a corresponding degradation in reconstructed signal quality. Such error propagation can occur, for example, in the output audio bits of an audio coder due to the use of control bits for codebook information, frame size information, synchronization information and so on. The perceptual audio coder (PAC) described in D. Sinha, J. D. Johnston, S. Dorward and S. R. Quackenbush, "The Perceptual Audio Coder," in Digital Audio, Section 42, pp. 42-1 to 42-18, CRC Press, 1998, which is incorporated by reference herein, attempts to minimize the bit rate requirements for the storage and/or transmission of digital audio data by the application of sophisticated hearing models and signal processing techniques. In the absence of channel errors, a PAC is able to achieve near stereo compact disk (CD) audio quality at a rate of approximately 128 kbps. At a lower bit rate of 96 kbps, the resulting quality is still fairly close to that of CD audio for many important types of audio material.

The rate of 96 kbps is particularly attractive for FM band transmission applications such as in-band digital audio broadcasting (DAB) systems, which are also known as hybrid in-band on-channel (HIBOC), all-digital IBOC and in-band adjacent channel (IBAC)/in-band reserve channel (IBRC) DAB systems. There is also a similar effort underway to provide digital audio broadcasting at lower audio bit rates in the AM band. For these AM systems, audio bit rates of about 32 to 48 kbps are being considered for daytime transmission and about 16 kbps for nighttime transmission. Higher audio bit rates, greater than about 128 kbps, are being used in multiple channel DAB systems. The transmission channels in the above-noted DAB systems tend to be severely bandlimited and noise limited at the edge of a coverage area. For mobile receivers, fading is also a severe problem. It is therefore particularly important in these and other applications to design an error protection technique that is closely matched to the error sensitivity of the various bits in the compressed audio bit stream.

PACs and other audio coding devices incorporating similar compression techniques are inherently packet-oriented, i.e., audio information for a fixed interval (frame) of time is represented by a variable bit length packet. Each packet includes certain control information followed by a quantized spectral/subband description of the audio frame. For stereo signals, the packet may contain the spectral description of two or more audio channels separately or differentially, as a center channel and side channels (e.g., a left channel and a right channel). Different portions of a given packet can therefore exhibit varying sensitivity to transmission errors. For example, corrupted control information leads to loss of synchronization and possible propagation of errors. On the other hand, the spectral components contain certain interframe and/or interchannel redundancy which can be exploited in an error mitigation algorithm incorporated in a PAC codec. Even in the absence of such redundancy, the transmission errors in different audio components have varying perceptual implications. For example, loss of stereo separation is far less annoying to a listener than spectral distortion in the mid-frequency range in the center channel.

Unequal error protection (UEP) techniques are designed to match error protection capability with sensitivity to transmission errors, such that the most important bits are provided with the highest level of error protection, while less important bits are provided with a lesser level or levels of error protection. A conventional two-level UEP technique for use in DAB applications is described in N. S. Jayant and E. Y. Chen, "Audio Compression: Technology and Applications," AT&T Technical Journal, pp. 23–34, Vol. 74, No. 2, March-April 1995. In this technique, which is based on a Reed-Solomon (RS) code, the control information is protected more robustly since it is not possible to use error mitigation on the non-redundant control information. In fact, the proper operation of the error mitigation algorithm used in a PAC codec is itself dependent upon reliable control information. All of the non-control spectral information in this technique is protected using a uniform level of error protection.

U.S. patent application Ser. No. 09/022,114, which was filed Feb. 11, 1998 in the name of inventors Deepen Sinha and Carl-Erik W. Sundberg, discloses techniques for providing UEP of a PAC bitstream by classifying the bits in different categories of error sensitivity. These classes were then matched to a suitable level of error protection to minimize the overall impact of errors, i.e., the most sensitive bits are more protected than the others. Certain of the UEP techniques described in the above-cited application generally provide improvements without regard to the type of channel, and the channel noise is typically assumed to be averaged over time and frequency by interleaving in both time and frequency for each channel code class. Thus, a UEP technique with a more powerful channel code properly matched to the most sensitive source bits always outperforms the corresponding equal error protection (EEP) technique.

U.S. patent application Ser. No. 09/163,656, which was filed Sep. 30, 1998 in the name of inventors Deepen Sinha and Carl-Erik W. Sundberg, discloses UEP techniques based on channel classification. In an example of this approach, audio information bits are separated into classes based on error sensitivity, and the classes of bits are then assigned to the channels such that the classes of bits having the greatest error sensitivity are transmitted over the channels which are the least susceptible to interference. Although the techniques described in the above-cited applications provide considerable improvement over prior approaches to UEP for digital audio, further improvements are needed for certain applications, e.g., multiple-program DAB, satellite DAB and other types of multiple program transmission.

SUMMARY OF THE INVENTION

The present invention provides methods and apparatus for implementing UEP in multiple program transmission applications, such as multiple program DAB. An illustrative embodiment of the invention determines a criticality measure, e.g., a value of a criticality flag, for a portion of a bitstream from each of a set of N programs, e.g., audio programs. The information bits for each of the N programs are then separated into n classes, where n is greater than or equal to two, such that a different separation into classes may be provided for each of the programs based on the corresponding criticality measures associated with those programs. Each of the classes is then provided with a different level of error protection, e.g., through the use of different convolutional codes or other suitable techniques. As a result, the programs with the highest criticality measures in a given frame or other designated time interval can have a larger percentage of their information bits placed into a class which is provided with a higher level of error protection.

In accordance with another aspect of the invention, the assignment of the multiple program bits to the classes, as well as the characteristics of the classes, may be fixed or dynamic. For example, in applications in which the criticality measures associated with one or more of the programs vary as a function of time, e.g., from audio frame to audio frame, the assignment of the bits to the classes can be varied from frame to frame so as to ensure that the programs having the highest criticality measures continue to be allocated to the classes of bits which are provided with the highest level of error protection.

The invention can be applied to other types of digital information, including, for example, video and image information. Moreover, the invention is applicable not only to perceptual coders but also to other types of source encoders using other compression techniques operating over a wide range of bit rates, and can be used with transmission channels other than radio broadcasting channels.

DETAILED DESCRIPTION OF THE INVENTION

Figure 1:
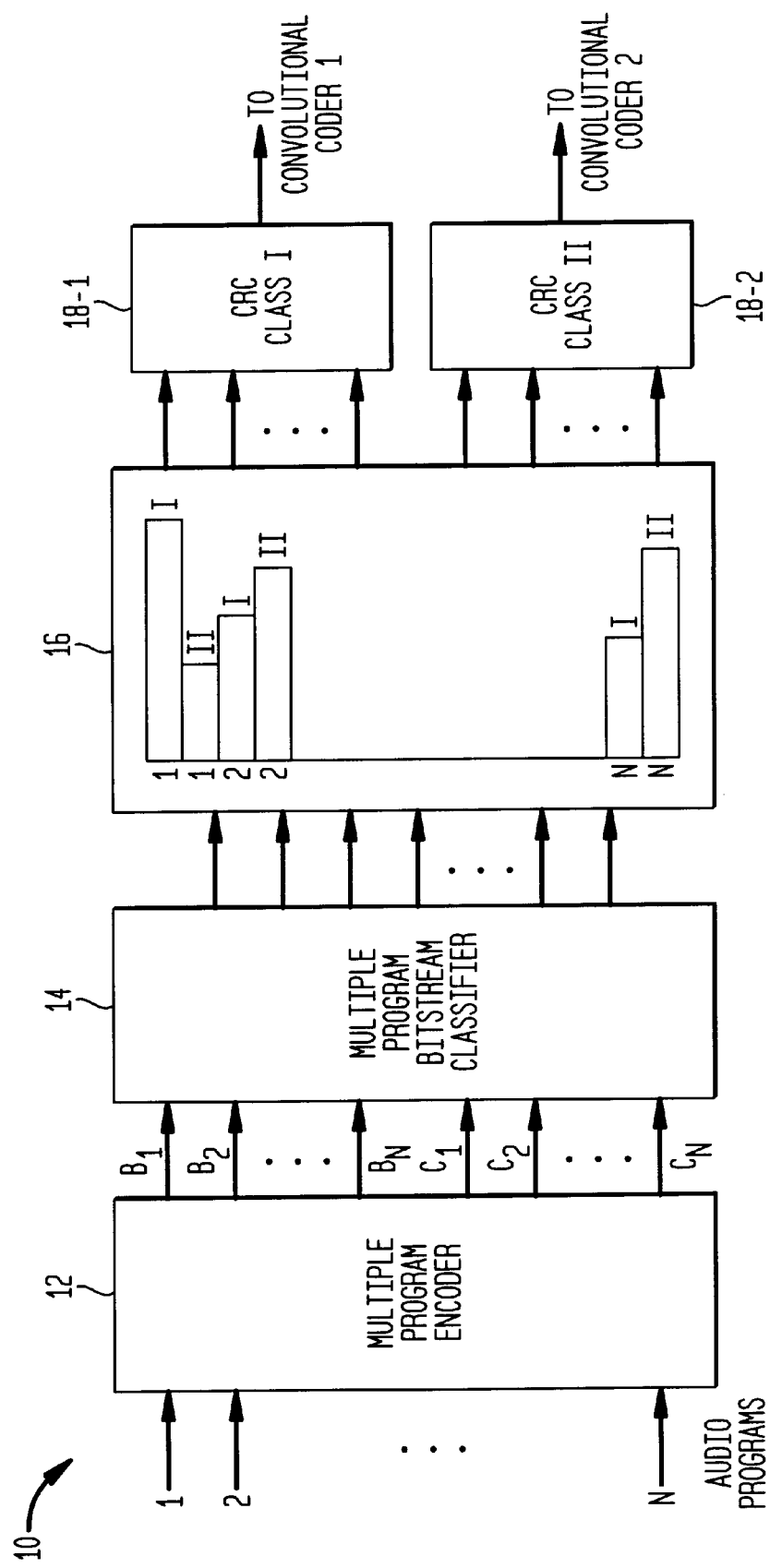
FIG. 1 shows a portion of a transmitter providing multiple program unequal error protection (UEP) in accordance with an illustrative embodiment of the invention.

The invention will be described below in conjunction with exemplary unequal error protection (UEP) techniques for use in the transmission of audio information bits, e.g., audio bits generated by an audio coder such as the perceptual audio coder (PAC) described in D. Sinha, J. D. Johnston, S. Dorward and S. R. Quackenbush, "The Perceptual Audio Coder," in Digital Audio, Section 42, pp. 42-1 to 42-18, CRC Press, 1998. It should be understood, however, that the UEP techniques of the invention may be applied to many other types of information, e.g., video or image information, and other types of coding devices. In addition, the invention may be utilized in a wide variety of different types of communication applications, including communications over the Internet and other computer networks, and over cellular multimedia, satellite, wireless cable, wireless local loop, high-speed wireless access, point-to-point systems and other types of communication systems. The invention may be utilized with any desired type of communication channel or channels, such as, for example, frequency channels, time slots, code division multiple access (CDMA) slots, and virtual connections in asynchronous transfer mode (ATM) or other packet-based transmission systems. The term "channel" as used herein is also intended to include a storage channel, e.g., a memory or other storage device, or a designated portion of such a device. The invention can thus also be applied to information storage applications, e.g., the storage of multiple programs using noisy storage channels.

The term "program" as used herein is intended to include any type of information signal, such as, for example, digital information associated with a given channel, or any other grouping of audio, video, data or other information, as well as portions or combinations of such groupings.

The present invention provides UEP for multiple program transmission applications, such as multiple program DAB. An illustrative embodiment of the invention determines a criticality measure, e.g., a value of a criticality flag, for a portion of a bitstream for each of a set of N programs. The information bits for that portion of each of the N programs are then separated into n classes, where n is greater than or equal to 2, such that a different separation into classes may be provided for each of the programs based on the corresponding criticality measures. Each of the classes is then provided with a different level of error protection, e.g., through the use of different convolutional codes or other suitable techniques. As a result, the programs with the highest criticality measures can have a larger percentage of their information bits placed into a class which is provided with a higher level of error protection.

In the case of audio programs, criticality may reflect the presence of certain critical features in the audio, such as onsets, transients or harmonics, or of a general characteristic or other quality, such as contribution to "richness" of the audio. For example, in PAC encoding, the presence of onsets in an audio frame is indicated using a criticality flag. In its simplest form, a criticality measure in accordance with the invention may be a single-bit binary flag indicating the presence or absence of a characteristic or other quality such as onsets. As another example, the criticality measure may be a linear criticality flag providing a number characterizing a designated quality of the corresponding program. Such a linear criticality flag will generally utilize multiple bits to provide a range of measures of criticality for a portion of an audio program. For example, the intermediate values of the criticality measure may be higher if there are transients or other higher harmonic contents in the segment. An example of a three-valued criticality flag $C_i$ of this type is as follows: $C_i=0$ indicates stationary low-complexity audio, $C_i=0.5$ indicates stationary higher-complexity audio, and $C_i=1$ indicates an onset or transient segment. Of course, the invention may utilize many other types of criticality measures, as will be appreciated by those skilled in the art. The criticality measures may be generated at fixed time intervals, e.g., every $T_f$ msecs where $T_f$ is the audio frame duration, typically 22 msec in PAC encoding. In this case, a criticality measure $C_i$, e.g., a single-bit or multi-bit criticality flag, indicates the criticality of the audio information of the given program in the $T_f$ time interval.

FIG. 1 is a block diagram of a portion of a transmitter 10 implementing multiple program UEP in accordance with the illustrative embodiment of the invention. The transmitter 10 includes a multiple program encoder 12 which receives as inputs N analog audio input signals. The multiple program encoder 12 may be implemented as a set of N separate audio encoders, e.g., N separate PAC encoders, each generating, e.g., a sequence of audio packets from a corresponding analog audio input signal. Alternatively, the multiple program encoder 12 may be implemented to provide joint audio coding of the N audio programs using techniques such as statistical multiplexing. Although the illustrative embodiment uses audio packets, such as those generated by a PAC encoder, the invention is more generally applicable to digital information in any form and generated by any type of compression technique. The output of the multiple program encoder 12 is a set of N output bitstreams $B_1, B_2, \ldots B_N$ and a corresponding set of criticality measures $C_1, C_2, \ldots C_N$. In a typical embodiment, the value of N may be on the order of 20 to 25, although other values could of course be used.

A given output bitstream $B_i$ represents an encoded audio signal, e.g., a sequence of audio packets, generated from the ith audio program. The criticality measure $C_i$ for the bitstream $B_i$ represents a measure of the criticality of the corresponding portion of the ith audio program, e.g., the criticality of the audio program for a given frame or other designated time interval. As noted above, the criticality measure $C_i$ may be a single-bit criticality flag indicative of the criticality of the corresponding portion of the ith audio program in a designated time interval such as a frame duration. In the case of audio programs, criticality may reflect the presence of certain critical features in the audio, such as transients or harmonics, or of a general characteristic or other quality, such as contribution to "richness" of the audio. Also as mentioned previously, the criticality measure $C_i$ may be a multi-bit linear criticality flag providing a number characterizing a designated quality of the corresponding program. The criticality measures may also be based on perceptual audio coding considerations such as those described in the above-cited U.S. patent application Ser. No. 09/022,114. For example, a particular class of bits for a given program may include the audio control bits as well as certain audio data bits corresponding to frequency bands which are perceptually important in reconstructing the encoded audio signal. These and other error sensitivity classification techniques are described in greater detail in application Ser. No. 09/022,114, and will not be further described herein.

The above-noted set of N output bitstreams $B_1, B_2, \ldots B_N$ and corresponding criticality measures $C_1, C_2, \ldots C_N$ generated by the multiple program encoder 12 are supplied as inputs to a multiple program bitstream classifier 14. The classifier 14 in this embodiment separates each of the bitstreams $B_i$ into two classes, i.e., class I bits and class II bits, and stores the separated bits for each of the bitstreams in a buffer 16. The buffer 16 in the illustrative embodiment includes separate storage for the class I and class II bits of each of the bitstreams, as indicated in the FIG. 1 example. Each of the classes I and II is subsequently provided with a different level of error protection, e.g., through the use of different convolutional codes or through other suitable techniques. The classifier 14 makes use of the criticality measures $C_1, C_2, \ldots C_N$ in order to determine how to apportion the bits of each of the bitstreams $B_1, B_2, \ldots B_N$ between the two classes I and II.

In general, the classifier 14 operates such that those bitstreams having the highest criticality measures have the largest percentage of their bits allocated to the class which is provided with the highest level of error protection. For example, assuming that class I will be provided with a higher level of error protection than class II, and assuming that the elements shown in buffer 16 reflect the quantities of class I and class II bits in a given frame of audio for each of the bitstreams $B_i$, it is apparent that bitstream $B_1$ has more bits of the given frame in class I than bitstream $B_2$ does, and thus must have a higher criticality measure for that frame than bitstream $B_2$. In an embodiment using a single-bit criticality measure, a program designated as critical, e.g., having a criticality bit at a logic one level, may have about 60–70% of its bits in class I and 30–40% of its bits in class II, while a program designated as non-critical, e.g., having a criticality bit at a logic zero level, may have about 45% of its bits in class I and about 55% of its bits in class II.

The criticality measures associated with the audio programs may vary as a function of time, e.g., may be updated for each frame of an audio program to reflect the criticality of that portion of the program. The operations of the multiple program classifier 14 in separating the bitstreams $B_i$ into classes I and II are then repeated for each frame, such that different percentages of the bits of each bitstream may be assigned to classes I and II for each of the frames. In such an embodiment, the assignment of bits to classes is dynamic, i.e., permitted to vary from frame to frame depending on the variations in the criticality measures. In other embodiments, the percentages of bits of a given program assigned to the classes may be fixed for a designated number of frames regardless of any variation in the criticality measures. The control bits associated with each of the bitstreams $B_i$ may be automatically assigned to class I, such that each of the bitstreams always has at least some of its bits in class I.

The outputs of the buffer 16 include N class I bitstreams which are supplied to a class I cyclic redundancy code (CRC) device 18-1, and N class II bitstreams which are supplied to a class II CRC device 18-2. In alternative embodiments, other types of codes, such as Reed-Solomon codes, BCH codes, or other types of block codes, may be used in the devices 18-1 and 18-2 as a replacement for the CRC code. In the illustrative embodiment, after conventional CRC coding is applied in the devices 18-1, 18-2, the resulting output streams are applied to respective first and second convolutional coders, which are not shown. The convolutional coders may use complementary puncturedpair convolutional (CPPC) codes, such as those described in greater detail in U.S. patent application Ser. No. 09/006,570, which was filed Jan. 13, 1998 in the name of inventors Brian Chen and Carl-Erik W. Sundberg. It should be noted that in the embodiment of FIG. 1, different codes, e.g., different CPPC code pairs, are used for classes I and II in order to provide the different levels of error protection. Non-codebased techniques could also be used to provide different levels of error protection for classes I and II, and in such cases the same convolutional code or other error correcting code may be used for both classes I and II. In addition, as previously noted, the techniques of the invention can be readily extended in a straightforward manner to the general case of n classes, where $n \geq 2$. Other possible variations include, for example, separate or joint interleaving, soft combining or equal gain combining, fixed or variable bit assignments, and use of other types of codes such as block codes.

It should also be noted that the transmitter 10 will generally include additional processing elements, such as interleavers, modulators, multiplexers, upconverters and the like, which are not shown in FIG. 1 for simplicity of illustration. In addition, the invention may be implemented using elements other than those shown. For example, the CRC elements 18-1 and 18-2 may be eliminated in embodiments that do not utilize CRC. Moreover, various elements of the transmitter 10, such as the multiple program encoder 12 and multiple program bitstream classifier 14, may be implemented using an application-specific integrated circuit, microprocessor or any other type of digital data processor, as well as portions or combinations of these and other known devices. Various aspects of the invention may also be implemented in the form of one or more software programs executed by a central processing unit (CPU) or the like in the digital data processor.

The above-described embodiments of the invention are intended to be illustrative only. For example, the invention can be implemented with different types of UEP, including both time division UEP as described in U.S. patent application Ser. No. 09/022,114, and frequency division UEP as described in U.S. patent application Ser. No. 09/163,656. In addition, the invention can be applied to the transmission of digital information other than audio, such as video, images and other types of information. Different types of coding, e.g., convolutional coding with different memories or other characteristics, trellis coded modulation, or other types of codes such as block codes, may also be used. Furthermore, the invention may make use of any desired type of modulation, including, e.g., single-carrier modulation in every channel, or multi-carrier modulation, e.g., orthogonal frequency division multiplexing (OFDM), in every channel. A given carrier can be modulated using any desired type of modulation technique, including, e.g., a technique such as m-QAM, m-PSK or trellis coded modulation.

It should be noted that any of the error sensitivity classification techniques described in the above-cited U.S. patent application Ser. No. 09/022,114, including multi-packet error protection profiles, may be used to classify the information bits in terms of error sensitivity. The UEP techniques described in Application Ser. No. 09/022,114 may be used to provide further levels of UEP within a given class. In addition, the techniques of the invention may be used to provide any number of different classes of UEP for information bits, and may be used with a wide variety of different bit rates and transmission channels. For example, as previously noted, alternative embodiments can extend the illustrative two-class techniques described above to any desired number n of classes in a straightforward manner.

Further embodiments of the invention could use other techniques for providing adaptive numbers and types of different classes. In addition, the number and/or characteristics of the classes, as well as the separation of the bits into classes, may be fixed or dynamic. For example, if the criticality measures of the programs vary as a function of time, the separation of the bits into classes can be varied as a function of time so as to ensure that the programs with the highest criticality measures continue to be allocated the largest percentage(s) of the class(es) with the greatest error protection. These and numerous other alternative embodiments and implementations within the scope of the following claims will be apparent to those skilled in the art.

What is claimed is:

1. A method of processing information bits from a plurality of programs for transmission in a communication system, the method comprising the steps of:
   determining a criticality measure for each of at least a subset of the programs; and
   separating the information bits for a given one of the programs into a plurality of classes of bits based on the corresponding criticality measure for that program, wherein each of the classes is provided with a different level of error protection, such that a program with a particular criticality measure has a different percentage of its information bits in one of the classes than another one of the programs with a different criticality measure.

2. The method of claim 1 wherein the determining step includes determining a value of a criticality flag for each of the programs.

3. The method of claim 2 wherein at least one of the criticality flags is a linear criticality flag providing a number characterizing a designated quality of the corresponding program.

4. The method of claim 1 wherein the separating step includes separating the bits of each of the programs into two classes, wherein one of the classes is provided with a higher level of error protection than the other, such that the program or programs having the highest criticality measure have the largest percentage of their bits in the class provided with the higher level of error protection.

5. The method of claim 1 wherein the determining and separating steps are repeated for each of a plurality of frames of information bits.

6. The method of claim 5 wherein percentages of bits of a given program assigned to the classes are fixed over at least a subset of the plurality of frames.

7. The method of claim 5 wherein percentages of bits of a given program assigned to the classes are permitted to vary over at least a subset of the plurality of frames.

8. The method of claim 1 further including the step of using complementary punctured pair convolutional (CPPC) codes to encode at least one of the classes of information bits.

9. The method of claim 1 wherein the criticality measures associated with at least a subset of the programs vary as a function of time, and further including the step of varying the separation of the bits into the classes so as to ensure that the programs having the highest criticality measures continue to have the largest percentage of bits in the class provided with the highest level of error protection.

10. An apparatus for use in processing information bits of a plurality of programs for transmission in a communication system, the apparatus comprising:
    a transmitter operative to determine a criticality measure for each of at least a subset of the programs; and to separate the information bits for a given one of the programs into a plurality of classes of bits based on the corresponding criticality measure for that program, wherein each of the classes is provided with a different level of error protection, such that a program with a particular criticality measure has a different percentage of its information bits in one of the classes than another one of the programs with a different criticality measure.

11. The apparatus of claim 10 wherein the transmitter is further operative to determine a value of a criticality flag for each of the programs.

12. The apparatus of claim 11 wherein at least one of the criticality flags is a linear criticality flag providing a number characterizing a designated quality of the corresponding program.

13. The apparatus of claim 10 wherein the transmitter is further operative to separate the bits of each of the programs into two classes, wherein one of the classes is provided with a higher level of error protection than the other, such that the program or programs having the highest criticality measure have the largest percentage of their bits in the class provided with the higher level of error protection.

14. The apparatus of claim 10 wherein the transmitter is further operative to repeat the determination and separation operations for each of a plurality of frames of information bits.

15. The apparatus of claim 14 wherein percentages of bits of a given program assigned to the classes are fixed over at least a subset of the plurality of frames.

16. The apparatus of claim 14 wherein percentages of bits of a given program assigned to the classes are permitted to vary over at least a subset of the plurality of frames.

17. The apparatus of claim 10 wherein the transmitter is further operative to utilize complementary punctured pair convolutional (CPPC) codes to encode at least one of the classes of information bits.

18. The apparatus of claim 10 wherein the criticality measures associated with at least a subset of the programs vary as a function of time, and wherein the transmitter is further operative to vary the separation of the bits into the classes so as to ensure that the programs having the highest criticality measures continue to have the largest percentage of bits in the class provided with the highest level of error protection.

19. A method of processing information bits from a plurality of programs for transmission in a communication system, the method comprising the step of:

separating the information bits for a given one of the programs into a plurality of classes of bits based on a corresponding criticality measure for that program, wherein each of the classes is provided with a different level of error protection, such that a program with a particular criticality measure has a different percentage of its information bits in one of the classes than another one of the programs with a different criticality measure.

20. An apparatus for use in processing information bits of a plurality of programs for transmission in a communication system, the apparatus comprising:

a transmitter operative to separate the information bits for a given one of the programs into a plurality of classes of bits based on a corresponding criticality measure for that program, wherein each of the classes is provided with a different level of error protection, such that a program with a particular criticality measure has a different percentage of its information bits in one of the classes than another one of the programs with a different criticality measure.

* * * * *